United States Patent Office 3,259,618
Patented July 5, 1966

3,259,618
DISAZO AND METALLIZED DISAZO DYES
CONTAINING A MONOCHLOROTRIAZINE
SUBSTITUENT
Herbert Francis Andrew, Manchester, England, assignor to Imperial Chemical Industries Limited, London, England, a corporation of Great Britain
No Drawing. Original application Nov. 16, 1959, Ser. No. 852,982. Divided and this application July 3, 1963, Ser. No. 292,754
Claims priority, application Great Britain, Nov. 28, 1958, 38,435/58
4 Claims. (Cl. 260—146)

This application is a continuation-in-part of application Serial No. 183,712 filed March 30, 1962 and now abandoned, which itself is a divisional of application Serial No. 852,982, filed November 16, 1959, now Patent No. 3,038,893.

The subject matter of the present application is concerned with selected dyestuffs of the broad class of azo dyestuffs which, in the form of the free acids are represented by the formula:

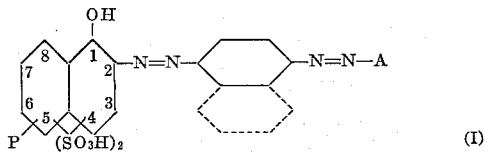

wherein A represents an aryl radical which does not contain a hydroxy group in an ortho position to the azo link, P represents a group of the formula:

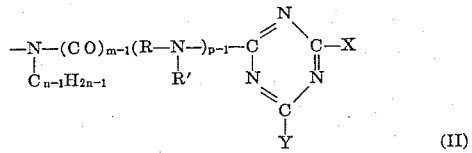

which is attached to the 6- or 7-position of the naphthalene nucleus, R represents a substituted or unsubstituted phenylene radical, R' represents a hydrogen atom or an alkyl radical, X represents a chlorine or a bromine atom, Y represents a chlorine or a bromine atom or an alkoxy, alkyl, aryl, aryloxy, arylmercapto or alkylmercapto radical, or a thiocyano, amino or substituted amino group, $m$ and $p$ each represent 1 or 2 and may be the same or different provided that $m$ is not 2 when $p$ is 1, $n$ represents a whole number and the phenylene or naphthylene radical represented by B may contain substituents.

In further defining this broad class by way of example, as examples of the aryl radicals represented by A there may be mentioned monocyclic aryl radicals such as phenyl, sulphophenyl, carboxyphenyl, methoxyphenyl, ethoxyphenyl, chlorophenyl, methylphenyl, nitrophenyl, benzeneazophenyl, sulphophenylazophenyl, acetylaminophenyl, benzoylaminophenyl and sulphocarboxyphenyl radicals and bicyclic aryl radicals such as naphthyl, sulphonaphthyl, disulphonaphthyl, methoxynaphthyl and ethoxynaphthyl radicals.

Further, as examples of the substituents which may be present in the phenylene or naphthylene radical B in said broad class there may be mentioned alkoxy for example lower alkoxy such as methoxy and ethoxy, alkyl for example lower alkyl such as methyl, carboxy, acylamino such acetylamino and benzoylamino, and sulpho.

Further, as examples of the substituted phenylene radicals represented by R in said broad class there may be mentioned 2-sulpho-1:4-phenylene and 2-sulpho-1:3-phenylene, and as examples of the alkyl radicals represented by R' in said broad class there may be mentioned lower alkyl radicals such as methyl, ethyl, propyl and butyl.

As examples of the radicals and groups represented by Y in said broad class there may be mentioned alkyl radicals for example lower alkyl radicals such as methyl and ethyl, aryl radicals for example monocyclic aryl radicals such as phenyl and tolyl, alkoxy radicals for example lower alkoxy radicals such as methoxy, propoxy and ethoxy, aryloxy radicals for example monocyclic aryloxy radicals such as phenoxy and sulphophenoxy, alkylmercapto radicals for example lower alkylmercapto radicals such as methylmercapto, arylmercapto radicals for example monocyclic arylmercapto radicals such as phenylmercapto, and substituted amino groups such as methylamino, ethylamino, propylamino, dimethylamino, diethylamino, dipropylamino, N-methyl-N-ethylamino, N-ethyl-N-propylamino, β-hydroxyethylamino, di(β-hydroxyethyl)amino, phenylamino, 2-sulphophenylamino, 3-sulphophenylamino, 4-sulphophenylamino, disulphophenylamino, 3-carboxyphenylamino, 4-carboxyphenylamino, naphthylamino, sulphonaphthylamino, disulphonaphthylamino, benzylamino, piperidyl, N-methyl-N-β-hydroxyethylamino, N - ethyl - N - β - hydroxyethylamino, N-methyl-N-phenylamino, N-ethyl-N-phenylamino, N-β-hydroxyethyl-N-phenylamino, 2:5 - dicarboxyphenylamino, N-methyl-N-3'-sulphophenylamino, N-ethyl - N - 4' - sulphophenylamino, N - β - hydroxy - N - 3'-sulphophenylamino, 3- or 4-methoxyphenylamino, 2-, 3-, or 4-methylphenylamino, 4-chlorophenylamino, 4-methyl - 3 - sulphophenylamino, 4 - chloro - 3 - sulphophenylamino and 3-carboxy-5-sulphophenylamino, but it is preferred that Y represents a chlorine atom or a sulphophenylamino or a disulphophenylamino group such as a 3:5-disulphophenylamino group.

The whole number represented by $n$ in said broad class is preferably a whole number not greater than 6 so that when $n$ represents a whole number from 2 to 6 the $C_{n-1}H_{2n-1}$ group represents a lower alkyl radical, or preferably $n$ represents 1 so that the $C_{n-1}H_{2n-1}$ group represents a hydrogen atom. It is also preferred that $m$ and $p$ each represent 1.

As stated above, the present application is concerned with a class of disazo dyestuffs selected from the broad class of dyestuffs so defined. The dyestuffs of the presently claimed invention are in part the disazo compounds represented by the following formula:

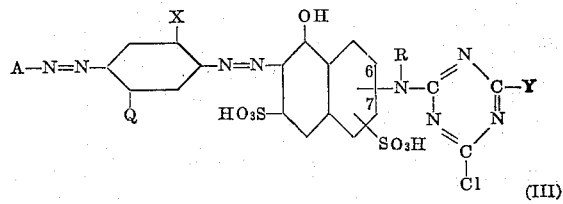

wherein A, Q, X, R and Y have the meanings stated below, and the —NR— group is attached to the 6- or 7-position of the naphthalene nucleus, and for the remainder are the 1:1 complex copper compounds of said disazo compounds.

In the above formula, A represents a di- or tri-sulphonaphthyl radical or a phenyl radical which contains a carboxy group or one or two sulphonic acid groups or contains both a sulphonic acid group and in addition from 1 to 2 further substituents selected from carboxy, methyl, methoxy and chlorine; Q represents a hydrogen atom, a methyl group or a methoxy group; X represents a methoxy or a carboxy group; R represents a hydrogen atom or a methyl group; and Y is one of the radicals: amino, lower alkylamino, β-hydroxyethylamino, methoxy, phenoxy, anilino, mono- and di-sulphoanilino, di- and tri-sulfonaphthylamino and sulphoanilino radicals containing from one to two radicals selected from carboxy and hydroxy.

The term "lower alkylamino" used above is used to denote a group of the formula —NHR where R is an alkyl radical of 1 to 3 carbon atoms.

The azo dyestuffs of Formula III can be obtained by diazotising an amine of the formula:

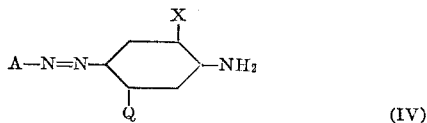

(IV)

wherein A, X and Q have the meanings stated above, and coupling the diazo compound so obtained with a coupling component of the formula:

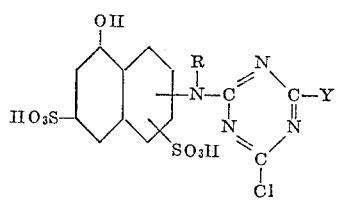

(V)

wherein R and Y have the meanings stated above.

This process can be conveniently carried out by adding sodium nitrite to a solution or suspension of the amine of Formula IV in a dilute aqueous solution of hydrochloric acid, adding the diazo solution or suspension so obtained to an aqueous solution of the coupling component of Formula V, adding sodium carbonate to maintain the pH of the mixture between 6.5 and 7 and filtering off the azo dyestuff which is precipitated. If desired sodium chloride can be added to ensure complete precipitation of all the azo dyestuff.

The amines of Formula IV can themselves be obtained by diazotising a primary amine of the formula: A—NH$_2$ wherein A has the meaning stated above and coupling the diazo compound so obtained with a para coupling amine of the formula:

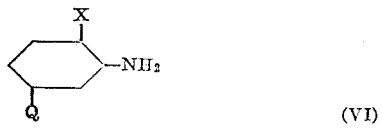

(VI)

wherein Q and X have the meaning stated above.

As examples of the primary amines of the formula: A—NH$_2$ which may be used there may be mentioned orthanilic acid, metanilic acid, sulphanilic acid, 2:5-dichloroaniline-4-sulphonic acid, 5-chloro-4-methylaniline-2-sulphonic acid, 4-methoxyaniline-2-sulphonic acid, 3-chloro-4-methylaniline-2-sulphonic acid, 4-chloroaniline-2-sulphonic acid, 4-chloro-3-methylaniline-6-sulphonic acid, 4-chloroaniline-3-sulphonic acid, aniline-2:4-disulphonic acid, aniline-2:5-disulphonic acid, anthranilic acid, 5-sulpho-anthranilic acid, 4-sulphoanthranilic acid, 2-naphthylamine 1:5-, 3:6-, 4:8-, 5:7- or 6:8-disulphonic acid, and 4-sulpho-2-aminoanisole.

As examples of the para coupling amines which may be used there may be mentioned 2-methoxy-5-methylaniline, 2:5-dimethoxyaniline, anthranilic acid and o-anisidine.

The coupling components of Formula V may themselves be obtained by treating a compound of the formula:

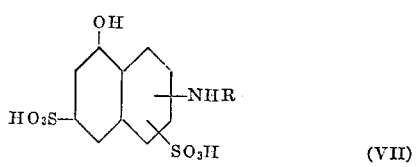

(VII)

wherein R has the meaning stated above, and the —NHR group is attached to the 6- or 7-position of the naphthalene nucleus, with a triazine of the formula:

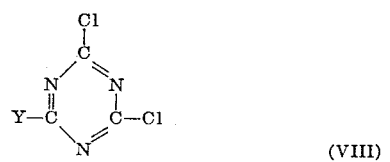

(VIII)

wherein Y has the meaning stated above.

As examples of the compounds of Formula VII which can be used there may be mentioned 2-amino-5-naphthol-1:7-disulphonic acid, 2-amino-8-naphthol-3:6-disulphonic acid and 2-methylamino-5-naphthol-1:7-disulphonic acid.

As examples of the triazines of Formula VIII which can be used there may be mentioned 2-methoxy-4:6-dichloro-1:3:5-triazine,
2-amino-4:6-dichloro-1:3:5-triazine,
2-methylamino-4:6-dichloro-1:3:5-triazine,
2-diethylamino-4:6-dichloro-1:3:5-triazine,
2-phenylamino-4:6-dichloro-1:3:5-triazine,
2-(2'-sulphophenylamino)-4:6-dichloro-1:3:5-triazine,
2-(3'-sulphophenylamino)-4:6-dichloro-1:3:5-triazine,
2-(4'-sulphophenylamino)-4:6-dichloro-1:3:5-triazine, and
2-phenoxy-4:6-dichloro-1:3:5-triazine.

The azo dyestuffs of Formula III can also be obtained by condensing an azo compound of the formula:

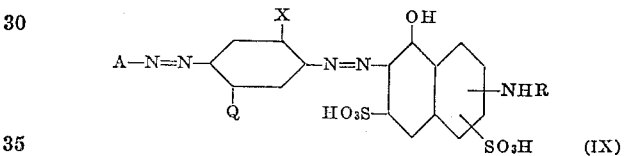

(IX)

wherein A, X, Q and R have the meanings stated above, with a triazine of Formula VIII as hereinbefore defined; by using instead the 1:1 copper complex of an azo compound of Formula IX, there is obtained a 1:1 copper complex of the dyestuff of Formula III.

This alternative process can be conveniently carried out by adding an aqueous solution of the azo compound of Formula IX or its copper complex to a suspension of the triazine of Formula VIII in a mixture of acetone and water, adding sodium carbonate to maintain the pH of the mixture between 5 and 7.5, and filtering off the azo dyestuff which is precipitated. If desired, sodium chloride can be added to ensure complete precipitation of all the azo dyestuff.

The azo compounds of Formula IX used in this alternative process can be obtained by coupling a diazotised amine of Formula IV with a compound of Formula VII, and the copper complexes of these compounds can be obtained by treatment of the compound with a hot, aqueous solution of cuprammonium sulphate.

The azo dyestuffs of Formula III or the 1:1 copper complex of such a dyestuff, can also be obtained by treating a dyestuff of Formula III or its copper complex wherein Y represents a chlorine atom and A, Q, X and R have the meanings stated above with one of the compounds: ammonia; a lower alkylamine; β-hydroxyalkylamine; aniline; an aniline mono- or di-sulphonic acid; a naphthylamine mono- or di-sulphonic acid; and aniline mono- or di-sulphonic acids containing one to two radicals selected from hydroxyl and carboxylic acid.

This process can be conveniently carried out by heating an aqueous solution of the dyestuff or its copper complex wherein Y represents a chlorine atom with one molecular proportion of the said compound at a temperature between 40° and 45° C., adding sodium carbonate to maintain the pH of the mixture between 7.0 and 7.2, adding sodium chloride and filtering off the dyestuff which is precipitated.

The azo dyestuff of Formula III and their 1:1 copper complexes are purple and reddish-blue dyes. They are valuable for colouring cellulose textile materials, for example cotton, viscose rayon and linen textile materials. For colouring these materials the new dyestuffs may be applied by dyeing or printing methods, preferably in conjunction with a treatment with an acid-binding agent, for example by the methods disclosed in United States Patent No. 2,892,671. When so applied the new dyestuffs and their copper complexes are capable of building up to give strong violet to navy-blue shades possessing very good fastness to light and to wet treatments such as washing, and hypochlorite bleach. The coloured fabrics have excellent storage stability and are highly resistant to the dye-to-fabric hydrolytic effect sometimes found in cellulose fabrics coloured with reactive dyes.

The invention is illustrated but not limited by the following examples in which the parts and percentages are by weight:

agent, the dyestuff yields violet shades with good fastness to light and to washing.

The following table gives further examples of the shades obtained on cellulose textile materials from other dyestuffs of the invention which are obtained by replacing the 11.7 parts of the trisodium salt of the aminodisazo compound used in the above example by an equivalent amount of the sodium salt of the aminoazo compound which is obtained by diazotising the primary amine listed in the second column of the table, coupling with the para-coupling amine listed in the third column, diazotising and coupling with the coupling component listed in the fourth column of the table, and by replacing the 3.8 parts of the sodium salt of 3-sulphoaniline by an equivalent amount of the amine listed in the fifth column of the table.

| Example | Primary Amine | Para-coupling Amine | Coupling Component | Amine | Shade on Cellulose Textile Materials |
|---|---|---|---|---|---|
| 2 | 2-sulphoaniline | 2-methoxyaniline | 2-amino-5-naphthol-1:7-disulphonic acid | 2-naphthylamine-4:8-disulphonic acid | Violet. |
| 3 | 2:5-disulphoaniline | 2-methoxy-5-methylaniline | do | Aniline | Do. |
| 4 | 2-naphthylamine-4:8-disulphonic acid | 2:5-dimethoxyaniline | do | 3:5-disulphoaniline | Do. |
| 5 | 2-naphthylamine-3:6:8-trisulphonic acid | 2-methoxy-5-methylaniline | do | 3-sulphoaniline | Do. |
| 6 | 2-naphthylamine-4:8-disulphonic acid | 2-carboxyaniline | 2-amino-8-naphthol-3:6-disulphonic acid | 5-sulpho-2-amino benzoic acid | Do. |
| 7 | 2:5-disulphoaniline | 2-methoxy-5-methylaniline | do | Ammonium hydroxide | Do. |
| 8 | 3-chloro-4-methyl-6-sulphoaniline | 2-methoxyaniline | do | 5-sulpho-2-amino benzoic acid | Do. |
| 9 | 2:5-disulphoaniline | 2-methoxy-5-methylaniline | 2-amino-5-naphthol-1:7-disulphonic acid | 3-sulphoaniline | Do. |
| 10 | 4-methoxyaniline-2-sulphonic acid | do | do | 4-sulphoaniline | Do. |
| 11 | 3-chloro-4-methyl-6-sulphoaniline | do | do | 5-sulpho-2-aminobenzoic acid | Do. |
| 12 | 2-sulphoaniline | do | 2-amino-8-naphthol-3:6-disulphonic acid | 3:5-disulphoaniline | Do. |
| 13 | 2:5-dichloro-4-sulphoaniline | do | do | 4-sulpho-2-aminobenzoic acid | Do. |
| 14 | 5-sulpho-2-aminobenzoic acid | do | 2-amino-5-naphthol-1:7-disulphonic acid | 3-amino-5-sulpho-2-hydroxybenzoic acid | Do. |
| 15 | 2:5-disulphoaniline | do | do | Ammonium hydroxide | Do. |
| 16 | do | do | do | Methylamine | Do. |
| 17 | do | do | do | β-Hydroxyethylamine | Do. |
| 18 | 4-methyl-2-sulphoaniline | do | 2-amino-8-naphthol-3:6-disulphonic acid | 4-sulpho-2-aminobenzoic acid | Do. |
| 19 | 2-aminobenzoic acid | do | do | 3:5-disulphoaniline | Do. |
| 20 | 2-sulphoaniline | do | 2-N-methylamino-5-naphthol-1:7-disulphonic acid | 4-sulphoaniline | Do. |
| 21 | 4-chloroaniline-2-sulphonic acid | do | 2-amino-8-naphthol-3:6-disulphonic acid | 3-sulphoaniline | Do. |
| 22 | 2-sulphoaniline | do | 2-methylamino-8-naphthol-3:6-disulphonic acid | Ammonia | Do. |

Example 1

Diazotised orthanilic acid is coupled with 2-methoxy-5-methylaniline and the aminoazo compound so obtained is diazotised and coupled under alkaline conditions with an equimolecular proportion of 2-amino-8-naphthol-3:6-disulphonic acid.

A solution of 11.7 parts of the trisodium salt of the amino-disazo compound so obtained in 400 parts of water is added with stirring to a suspension of 3.25 parts of cyanuric chloride in a mixture of 50 parts of acetone, 180 parts of ice and 100 parts of water, the temperature being maintained between 0° and 5° C. by external cooling. The mixture is stirred for 1½ hours then neutralised to pH 6.8 with 12 parts of a 10% aqueous solution of sodium carbonate. A solution of 3.8 parts of the sodium salt of 3-sulphoaniline in 35 parts of water is added to the solution of dichlorotriazinylamino compound and the mixture is then heated for 3 hours at a temperature between 40° and 45° C. The pH of the solution being maintained at 7 by the addition of a 10% aqueous solution of sodium carbonate. 60 parts of sodium chloride are then added and the dyestuff which is precipitated is filtered off and dried.

On analysis the dyestuff so obtained is found to contain 0.95 atom of organically bound chlorine for each disazo molecule present. When applied to cellulose textile materials in conjunction with a treatment with an acid-binding

Example 23

Diazotised orthanilic acid is coupled with 2-methoxy-5-methylaniline and the aminoazo compound so obtained is diazotised and coupled under alkaline conditions with an equimolecular proportion of 2-amino-8-naphthanol-3:6-disulphonic acid.

A solution of 17.4 parts of the trisodium salt of the aminodisazo compound so obtained in 400 parts of water is added with stirring to a suspension of 4.6 parts of 2-methoxy-4:6-dichlorotriazine in a mixture of 40 parts of acetone and 100 parts of water and the mixture is then stirred at a temperature between 35° and 45° C. for 2 hours the pH of the mixture being maintained at 7 by the addition of a 10% aqueous solution of sodium carbonate. 80 parts of sodium chloride are then added and the dyestuff which is precipitated is filtered off, washed with 15 parts of water and dried. On analysis, the dyestuff so obtained is found to contain 0.85 atom of organically bound chlorine for each disazo molecule present. When applied to cellulose textile materials in conjunction with a treatment with an acid-binding agent the dyestuff yields violet shades having good fastness to washing and to light.

Example 24

By replacing the 4.6 parts of 2-methoxy-4:6-dichlorotriazine used in Example 23 by 6.1 parts of 2-phenoxy-4:6-dichlorotriazine there is obtained a dyestuff which contains 0.98 atom of organically bound chlorine for each disazo molecule present. When applied to cellulose textile materials in conjunction with a treatment with an acid-binding agent the dyestuff yields violet shades possessing good fastness to light and to washing.

*Example 25*

Diazotised aniline-2:5-disulphonic acid is coupled with 2-methoxy-5-methylaniline, the aminoazo compound so obtained is diazotised and coupled under alkaline conditions with an equimolecular proportion of 2-amino-5-naphthol-1:7-disulphonic acid and the resultant aminodisazo compound is converted to the copper complex by heating it with an aqueous solution of cuprammonium sulphate for 20 hours at a temperature between 95° and 100° C.

A solution of 21 parts of the tetrasodium salt of the above copper complex in 230 parts of water is added with strring to a solution of 8.8 parts of the sodium salt of 2-(3'-sulphoanilino)-4:6-dichlorotriazine in a mixture of 120 parts of water and 40 parts of acetone and the mixture is then stirred at a temperature between 40° and 45° C. for 2½ hours, the pH of the mixture being maintained at 7 by the addition of a 10% aqueous solution of sodium carbonate. 80 parts of sodium chloride are then added and the dyestuff which is precipitated is filtered off, washed with 10 parts of water and dried. On analysis the dyestuffs so obtained is found to contain 0.9 atom of organically bound chlorine for each disazo molecule present. When applied to cellulose textile materials in conjunction with a treatment with an acid-binding agent the dyestuff yields navy-blue shades possessing good fastness to washing and to light.

*Example 26*

In place of the 8.8 parts of the sodium salt of 2-(3'-sulphoanilino)-4:6-dichlorotriazine used in Example 25 there are used 4.8 parts of 2-methoxy-4:6-dichlorotriazine. The dyestuff so obtained when applied to cellulose textile materials in conjunction with a treatment with an acid-binding agent yields navy-blue shades possessing good fastness to washing and to light.

*Example 27*

In place of the 8.8 parts of the sodium salt of 2-(3'-sulphoanilino)-4:6-dichlorotriazine used in Example 25 there are used 6.4 parts of 2-phenoxy-4:6-dichlorotriazine. The dyestuff so obtained, when applied to cellulose textile materials in conjunction with a treatment with an acid-binding agent yields navy-blue shades possessing good fastness to washing and to light.

*Example 28*

Diazotised orthanilic acid is coupled with 2-methoxy-5-methylaniline, the aminoazo compound so obtained is diazotisted and coupled under alkaline conditions with an equimolecular proportion of 2-N-methylamino-5-naphthol-1:7-disulphonic acid and the aminodisazo compound so obtained is converted to its copper complex by heating it for 20 hours at a temperature between 95° and 100° C. with an aqueous solution of cuprammonium sulphate.

A solution of 19.3 parts of the trisodium salt of the copper-containing aminodisazo compound so obtained in 250 parts of water is added with stirring to a suspension of 4.8 parts of cyanuric chloride in a mixture of 50 parts of acetone, 100 parts of water and 200 parts of ice, the temperature of the mixture being maintained between 0° and 5° C. by the addition of ice. The mixture is stirred for 1 hour at a temperature between 0° and 5° C., and the mixture is then neutralised to pH 6.8 by the addition of 9.2 parts of a 10% aqueous solution of sodium carbonate. To the solution of dichlorotriazinylamino compound so obtained there is added a solution of 5.4 parts of the sodium salt of 3-sulphoaniline in 30 parts of water and the mixture is stirred at a temperature between 40° and 45° C. for 3 hours, the pH of the mixture being maintained at 7 by the addition of a 10% aqueous solution of sodium carbonate. 90 parts of sodium chloride are then added and the dyestuff which is precipitated is filtered off and dried.

On analysis the dyestuff so obtained is found to contain 1.1 atoms of organically bound chlorine for each disazo molecule present. When applied to cellulose textile materials in conjunction with a treatment with an acid-binding agent the dyestuff yields navy-blue shades possessing good fastness to washing and to light.

The following table gives further examples of the shades obtained on cellulose textile materials from the copper-containing dyestuffs obtained by the procedure described in Example 28 when the amino-disazo compound used in Example 28 is replaced by the amino-disazo compound obtained by diazotising the primary amine listed in the second column of the table, coupling with the para-coupling amine listed in the third column of the Table, diazotising and coupling with the coupling component listed in the fourth column and by replacing the 3-sulphoaniline used in Example 28 by the amine listed in the fifth column of the table.

| Example | Primary Amine | Para-coupling Amine | Coupling Component | Amine | Shade on Cellulose Textile Materials |
|---|---|---|---|---|---|
| 29 | 3-chloro-4-methyl-6-sulphoaniline. | 2-methoxy-5-methylaniline. | 2-amino-8-naphthol-3:6-disulphonic acid. | 3-sulphoaniline | Blue. |
| 30 | do | do | do | 5-sulpho-2-aminobenzoic acid. | Do. |
| 31 | do | do | do | 4-sulpho-2-aminobenzoic acid. | Do. |
| 32 | do | do | do | 3-amino-5-sulpho-2-hydroxybenzoic acid. | Do. |
| 33 | do | do | do | 4-sulphoaniline | Do. |
| 34 | do | do | do | Aniline-3:5-disulphonic acid | Do. |
| 35 | do | do | do | Ammonium hydroxide | Do. |
| 36 | do | do | do | Methylamine | Do. |
| 37 | 4-methyl-2-sulphoaniline | do | do | 5-sulphoanthranilic acid | Do. |
| 38 | do | do | do | 4-sulphoanthranilic acid | Do. |
| 39 | do | do | do | 3-amino-5-sulpho-2-hydroxybenzoic acid. | Do. |
| 40 | do | 2-methoxyaniline | do | 5-sulpho-2-aminobenzoic acid. | Do. |
| 41 | Aniline-2:5-disulphonic acid | 2-methoxy-5-methyl-aniline | do | Ammonium hydroxide | Do. |
| 42 | 2:5-dichloro-4-sulphoaniline | do | do | 5-sulpho-2-aminobenzoic acid. | Do. |
| 43 | do | do | do | 3-amino-5-sulpho-2-hydroxybenzoic acid | Do. |
| 44 | 3-chloro-4-methyl-6-sulphoaniline. | 2-methoxyaniline | do | 5-sulpho-2-aminobenxoic acid. | Do. |
| 45 | do | do | do | 3-sulphoaniline | Do. |
| 46 | do | do | do | 4-sulphoaniline | Do. |
| 47 | do | do | do | 3-amino-5-sulpho-2-hydroxybenzoic acid. | Do. |

| Example | Primary Amine | Para-coupling Amine | Coupling Component | Amine | Shade on Cellulose Textile Materials |
|---|---|---|---|---|---|
| 48 | 2-naphthylamine-6:8-disulphonic acid | 2-methoxy-5-methylaniline | 2-amino-8-naphthol-3:6-disulphonic acid | 5-sulpho-2-aminobenzoic acid | Blue. |
| 49 | 2-naphthylamine-5:7-disulphonic acid | ___do___ | ___do___ | ___do___ | Do. |
| 50 | 2-naphthylamine-4:8-disulphonic acid | 2-aminobenzoic acid | ___do___ | 3-sulphoaniline | Violet. |
| 51 | 2-naphthylamine-6:8-disulphonic acid | 2-methoxyaniline | ___do___ | 4-sulpho-2-aminobenzoic acid | Blue. |
| 52 | 2-sulphoaniline | 2-methoxy-5-methylaniline | ___do___ | 3:5-disulphoaniline | Do. |
| 53 | 2:5-disulphoaniline | ___do___ | 2-amino-5-naphthol-1:7-disulphonic acid | 2-naphthylamine-4:8-disulphonic acid | Navy-blue. |
| 54 | 2-naphthylamine-3:6:8-trisulphonic acid | ___do___ | ___do___ | 3-sulphoaniline | Blue. |
| 55 | 4-methyl-2-sulphoaniline | ___do___ | ___do___ | 5-sulpho-2-aminobenzoic acid | Do. |
| 56 | 4-methoxy-2-sulphoaniline | ___do___ | 2-amino-8-naphthol-3:6-disulphonic acid | ___do___ | Do. |
| 57 | 2-aminobenzoic acid | ___do___ | 2-amino-5-naphthol-1:7-disulphonic acid | 3:5-disulphoaniline | Do. |
| 58 | 5-sulpho-2-aminobenzoic acid | ___do___ | ___do___ | 3-sulphoaniline | Do. |
| 59 | 2-naphthylamine-5:7-disulphonic acid | 2:5-dimethoxyaniline | ___do___ | ___do___ | Do. |
| 60 | 2-sulphoaniline | 2-methoxy-5-methylaniline | 2-N-methylamino-5-naphthol-1:7-disulphonic acid | 5-sulpho-2-aminobenzoic acid | Navy-blue. |
| 61 | Aniline-2:5-disulphonic acid | ___do___ | 2-amino-5-naphthol-1:7-disulphonic acid | 3:5-disulphoaniline | Do. |
| 62 | ___do___ | ___do___ | ___do___ | 5-sulpho-2-aminobenzoic acid | Do. |
| 63 | ___do___ | ___do___ | ___do___ | 3-sulphoaniline | Do. |
| 64 | ___do___ | ___do___ | ___do___ | Mixture of aniline-3:5-disulphonic acid (3.3 parts) and 5-sulpho-2-aminobenzoic acid (3.1 parts). | Do. |
| 65 | ___do___ | ___do___ | ___do___ W | 2-naphthylamine-3:6:8-trisulphonic acid | Do. |
| 66 | ___do___ | ___do___ | ___do___ | 2-aminophenol-4:6-disulphonic acid | Do. |
| 67 | Aniline-2:4-disulphonic acid | ___do___ | ___do___ | 3-sulphoaniline | Do. |
| 68 | 4-chloroaniline-2-sulphonic acid | ___do___ | 2-amino-8-naphthol-3:6-disulphonic acid | ___do___ | Blue. |
| 69 | ___do___ | ___do___ | ___do___ | 5-sulpho-2-aminobenzoic acid | Do. |
| 70 | 2-chloroaniline-4-sulphonic acid | ___do___ | ___do___ | 4-sulphoaniline | Do. |
| 71 | 2-sulphoaniline | ___do___ | 2-N-methylamino-8-naphthol-3:6-disulphonic acid | 3-sulphoaniline | Do. |
| 72 | 4-chloro-5-methylaniline-2-phonic acid | ___do___ | ___do___ | Ammonia | Do. |
| 73 | 2-sulphoaniline | 2-methoxyaniline | ___do___ | 4-sulphoaniline | Do. |

| Example | Primary Amine | Primary Coupling Amine | Coupling Component | Amine | Shade on Cellulose Textile Materials |
|---|---|---|---|---|---|
| 74 | 4-methyl-2-sulphoaniline | 2-methoxy-5-methylaniline | 2-amino-8-naphthol-3:6-disulphonic acid | 4-aminobenzoic acid | Blue. |
| 75 | 3-chloro-4-methyl-6-sulphoaniline | ___do___ | ___do___ | ___do___ | Do. |
| 76 | ___do___ | ___do___ | ___do___ | Equimolecular mixture of 4-aminobenzoic acid and 5-sulphoanthranilic acid. | Do. |
| 77 | 4-methyl-2-sulphoaniline | ___do___ | ___do___ | Equimolecular mixture of 4-aminobenzoic acid and metanilic acid. | Do. |
| 78 | ___do___ | ___do___ | ___do___ | Equimolecular mixture of metanilic acid and sulphanilic acid. | Do. |

I claim:

1. The disazo compounds represented by the formula:

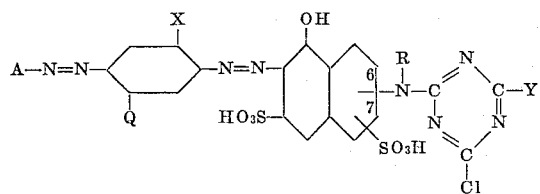

wherein A is a radical selected from the class consisting of monocarboxy phenyl radicals, monosulphophenyl radicals, disulphophenyl radicals, disulphonaphthyl radicals, trisulphonaphthyl radicals, sulphocarboxyphenyl radicals and methylchlorsulphophenyl radicals Q is selected from the group consisting of H, CH₃ and CH₃O; X is selected from the group consisting of CH₃O and CO₂H; R is selected from the group consisting of H and CH₃; and Y is selected from the group consisting of amino, anilino, sulphonated naphthylamino, sulphocarboxyaniline, sulphohydroxycarboxyanilino, lower alkylamino, methoxy and phenoxy, and the 1:1-copper complexes of said disazo compounds.

2. The 1:1-copper complex of the disazo compound of the formula:

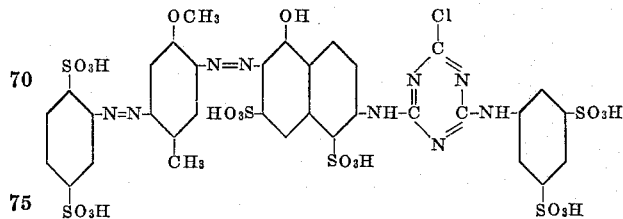

3. A mixture of the 1:1-copper complexes of compounds represented by the formula:

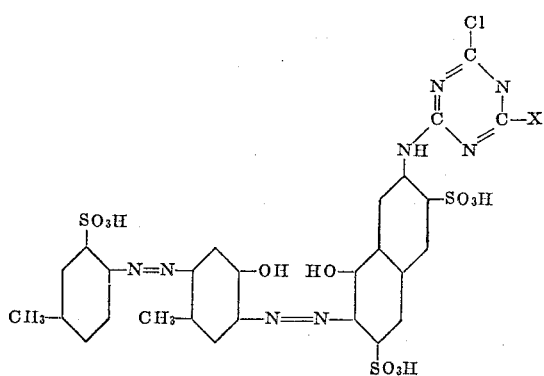

wherein X represents a radical selected from the group consisting of meta sulfoanilino and para sulfoanilino.

4. The 1:1-copper complex of the compound represented by the formula:

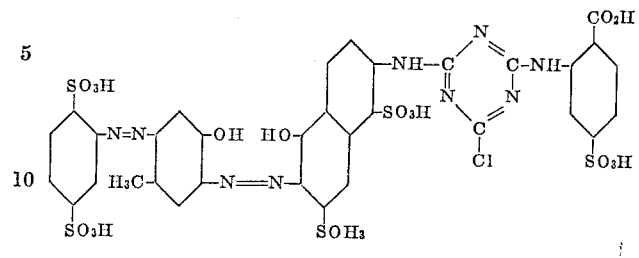

References Cited by the Examiner
UNITED STATES PATENTS

| | | | |
|---|---|---|---|
| 2,945,022 | 7/1960 | Fasciati et al. | 260—153 |
| 2,993,038 | 7/1961 | Fasciati et al. | 260—153 |
| 3,057,844 | 10/1962 | Andrew et al. | 260—153 XR |
| 3,057,846 | 10/1962 | Andrew et al | 260—153 XR |

CHARLES B. PARKER, *Primary Examiner.*
R. J. FINNEGAN, D. M. PAPUGA, *Assistant Examiners.*